United States Patent
Zmijewski et al.

(10) Patent No.: US 10,255,671 B1
(45) Date of Patent: Apr. 9, 2019

(54) SYSTEM AND METHOD FOR CAPTURE OF HIGH RESOLUTION/HIGH MAGNIFICATION IMAGES

(71) Applicants: Matthew Zmijewski, Groton, MA (US); Scott W. Blake, Wesford, MA (US); Eric Eisack, Cambridge, MA (US); Robert Luoma, Newton, MA (US)

(72) Inventors: Matthew Zmijewski, Groton, MA (US); Scott W. Blake, Wesford, MA (US); Eric Eisack, Cambridge, MA (US); Robert Luoma, Newton, MA (US)

(73) Assignee: ASSEMBLY GUIDANCE SYSTEMS, INC., Chelmsford, MA (US)

( * ) Notice: Subject to any disclaimer, the term of this patent is extended or adjusted under 35 U.S.C. 154(b) by 452 days.

(21) Appl. No.: 15/084,667

(22) Filed: Mar. 30, 2016

Related U.S. Application Data

(63) Continuation of application No. 15/061,504, filed on Mar. 4, 2016, now abandoned.
(Continued)

(51) Int. Cl.
*G06T 7/00* (2017.01)
*H04N 7/18* (2006.01)

(52) U.S. Cl.
CPC ............. *G06T 7/001* (2013.01); *H04N 7/183* (2013.01); *G06T 2207/30108* (2013.01)

(58) Field of Classification Search
CPC .................................................... G06T 7/001
See application file for complete search history.

(56) References Cited

U.S. PATENT DOCUMENTS 6,088,423 A * 7/2000 Krug .................... G01V 5/0041
378/4
6,295,335 B1 * 9/2001 Cossard ................. G01N 23/04
378/70

(Continued)

OTHER PUBLICATIONS

Ramesh Jain, Rangachar Kasturi, Brian G. Schunck, Chapter 12. Calibration (pp. 309-364) Published by McGraw-Hill, Inc., ISBN 0-07-032018-7, 1995, Machine Vision, http://www.cse.usf.edu/~r1k/MachineVisionBook/MachineVision.files/MachineVision_Chapter12.pdf.

(Continued)

*Primary Examiner* — Jayanti K Patel
*Assistant Examiner* — Irfan Habib
(74) *Attorney, Agent, or Firm* — Burns & Levinson, LLP; Orlando Lopez

(57) ABSTRACT

Methods and systems for efficient inspection that provide a record and enable remote inspection. The system of these teachings includes a source of electromagnetic radiation, a first aiming subsystem optically operatively disposed to receive the electromagnetic radiation from the source of electromagnetic radiation, the first aiming subsystem optically aiming the electromagnetic radiation onto a surface on which an object is disposed, an image acquisition component, a second aiming subsystem optically operatively disposed such that the second aiming subsystem aims an optical field of the image acquisition component to locations on the surface on which the object is disposed, and a computing component configured to establish the object, the first aiming subsystem and the second aiming subsystem in a common coordinate system, wherein the optical field of the image acquisition is aimed at regions illuminated by the electromagnetic radiation.

26 Claims, 18 Drawing Sheets

The system with two sets of aiming optics, a laser, a collimator, a retro-reflection detector, and a camera.

Related U.S. Application Data

(60) Provisional application No. 62/129,394, filed on Mar. 6, 2015.

(56) References Cited

U.S. PATENT DOCUMENTS

| | | | |
|---|---|---|---|
| 6,304,680 B1 | 10/2001 | Blake et al. | |
| 6,757,445 B1 | 6/2004 | Knopp | |
| 6,912,293 B1 | 6/2005 | Korobkin | |
| 7,020,241 B2* | 3/2006 | Beneke | G01V 5/0016 378/54 |
| 9,128,200 B2* | 9/2015 | Muenster | G01V 5/0058 |
| 9,653,258 B2* | 5/2017 | Grzelakowski | G01N 23/04 |
| 2008/0025464 A1* | 1/2008 | Foland | G01N 23/04 378/57 |
| 2008/0063140 A1* | 3/2008 | Awad | G01N 23/04 378/57 |
| 2008/0137809 A1* | 6/2008 | Hartick | G01V 5/0016 378/57 |
| 2008/0226016 A1* | 9/2008 | Koehler | G06T 11/006 378/4 |
| 2008/0245873 A1* | 10/2008 | Dwinell | G06T 7/60 235/462.41 |
| 2010/0208039 A1* | 8/2010 | Stettner | G01B 11/00 348/49 |
| 2012/0070063 A1* | 3/2012 | Stalker | G01N 21/8851 382/141 |
| 2012/0138514 A1* | 6/2012 | Janssens | B07C 5/342 209/577 |
| 2016/0254120 A1* | 9/2016 | Grzelakowski | G01N 23/04 250/310 |
| 2016/0334535 A1* | 11/2016 | Dreiseitel | G01V 5/005 |

OTHER PUBLICATIONS

David Dechow, Machine Vision Inspection Software, https://www.qualitymag.com/articles/92478-machine-vision-inspection-software, Quality Magazine, Mar. 3, 2015.

Jeffrey J. Shan, A Photogrammetric Solution for Projective Reconstruction, Part of the SPIE Conference on Vision Geometry VIII, Denver, Colorado, Jul. 1999, SPIE vol. 3811, 296-304.

Konrad Schindler, Mathematical Foundations of Photogrammetry, Jan. 2015 published Aug 25, 2015.

Bob Garwood, "Choosing the Right Photoelectric Sensing Mode" Sensors, Dec. 1999.

* cited by examiner

The system with two sets of aiming optics, a laser, a collimator, a retro-reflection detector, and a camera.

Laser aiming system sequencing the dot of laser light through a series of points to make a persistent image on a surface.

A human inspector viewing a projected laser pattern to verify process results.

A camera capturing the projected laser pattern for remote or automatic process verification Laser aiming system and camera aiming system in common coordinate system for part to be inspected High resolution image capture of region on object with projected reference pattern of laser light Laser aiming system with collimator and retro-reflection sensor Two systems configured off-axis relative to each other so the projected references will be distorted by parallax on wrinkles or loose material when viewed by the off-axis camera aiming system Using the laser and collimator as illumination source for images captured by the camera aiming system Laser projection indicating location of detected flaw Expanded laser spot illuminating retro-reflective reference

SYSTEM AND METHOD FOR CAPTURE OF HIGH RESOLUTION/HIGH MAGNIFICATION IMAGES

CROSS REFERENCE TO RELATED APPLICATIONS

This application is a continuation of co-pending U.S. patent application Ser. No. 15/061,504, filed Mar. 4, 2016, which in turn claims priority of U.S. Provisional Application Ser. No. 62/129,394, filed Mar. 6, 2015, entitled SYSTEM AND METHOD FOR CAPTURE OF HIGH RESOLUTION/HIGH MAGNIFICATION IMAGES, both of which are incorporated by reference herein in their entirety for all purposes.

FIELD

This disclosure relates to a system and method for automatic capture of high resolution/high magnification of images, in particular in automated and manual manufacturing systems.

BACKGROUND

Many automated and manual manufacturing systems consume an inordinate amount of time inspecting, verifying and documenting that processes have occurred completely and accurately. Factors that contribute to this non-value-adding time are: creating accurate inspection references, getting a human inspector into proximity of the features to be inspected, and requiring human, rather than fully automated inspection.

Laser projected tolerance patterns are used by inspectors that are physically present at the part being manufactured. This process is inefficient because the inspector must move to the part to perform the inspection. In addition to being inefficient, there may be hazards present in the physical environment that the inspector must move through and to, such as moving machinery, sharp edges, trip hazards, etc. The inspector must either wait at the part while processing is occurring (wasting inspector time and/or being hazardous), or move to another part that requires inspection. The synchronization of the processing and inspection is rarely optimal, resulting in wasted cycle time while waiting for the inspector, or wasted inspector time, waiting for the process.

Cameras are also used inefficiently for inspection. On large parts, a camera must be aimed and zoomed in order to obtain detailed images to validate fabrication. Traditional pan/tilt systems are slow and inaccurate and must be programmed to automatically, but slowly, be aimed at the region of interest for the inspection process.

When a human inspector looks at a feature on a part relative to projected laser tolerances they will typically "buy off" the inspection by entering a code on a terminal. This is a record that indicates that the inspection was acceptable, but provides no physical evidence that can be referred to, or reevaluated, at a later date.

Another common problem in manufacturing is the unintended presence of anything that is not part of the design. In aerospace practice, this is called "FOD" (Foreign Objects or Debris). FOD can take many forms, ranging from tools or parts (rulers, screws, labels, protective cover material) left in a product, to things that fall out of peoples' pockets (coins, note paper) to random things present in the manufacturing environment, such as dead insects, dead leaves tracked in on people's shoes, even feathers and excrement from a bird that may be trapped in the factory.

There is a need for methods and systems for efficient inspection that provide a record and detect foreign objects, and enable remote inspection.

SUMMARY

Methods and systems for efficient inspection that provide a record and detect foreign objects, and enable remote inspection are disclosed hereinbelow, In one or more embodiments, the system of these teachings includes a source of electromagnetic radiation, a first aiming subsystem optically operatively disposed to receive the electromagnetic radiation from the source of electromagnetic radiation, the first aiming subsystem optically aiming the electromagnetic radiation onto a surface on which an object is disposed, an image acquisition component, a second aiming subsystem optically operatively disposed such that the second aiming subsystem aims an optical field of the image acquisition component to locations on the surface on which the object is disposed and on the object at which the electromagnetic radiation has been aimed, and a computing component receiving angular information defining a spatial relationship between the first aiming subsystem and predetermined features and angular information between the second aiming subsystem and the surface on which the object is disposed and the object; the predetermined features being located on the surface on which the object is disposed and on the object, the computing component being configured to establish the object, the first aiming subsystem and the second aiming subsystem in a common coordinate system, wherein the optical field of the image acquisition is aimed at regions illuminated by the electromagnetic radiation.

In one instance, the image acquisition component includes an electronic camera with a high magnification lens.

In another instance, the source of electromagnetic radiation comprises an emitting component, such as a laser, and an optical system optically disposed to receive the electromagnetic radiation from the emitting component.

In one or more embodiments, the method of these teachings includes obtaining angular information defining a spatial relationship between a first aiming subsystem and predetermined features and angular information between a second aiming subsystem and a surface on which an object is disposed and the object; the predetermined features being located on the surface on which the object is disposed and on the object, the first aiming subsystem optically operatively disposed to receive electromagnetic radiation from a first source of electromagnetic radiation; the first aiming subsystem optically aiming the electromagnetic radiation from the first source onto the surface on which the object is disposed, the second aiming subsystem optically operatively disposed such that the second aiming subsystem aims an optical field of a first image acquisition component to locations on the surface on which the object is disposed and on the object, determining a common coordinate system for the object, the first aiming subsystem and the second aiming subsystem, and aiming the electromagnetic radiation from the first source to illuminate inspection reference patterns on the surface of the object substantially simultaneous with aiming of the optical field of the first image acquisition component; and capturing calibrated images of features on the object; the calibrated images generated by illumination of inspection reference patterns.

In one instance, the method of these teachings also includes obtaining angular information defining a spatial relationship between a third aiming subsystem and predetermined features and angular information between a fourth aiming subsystem and a surface on which an object is disposed and the object, the predetermined features being located on the surface on which the object is disposed and on the object, the third aiming subsystem optically operatively disposed to receive electromagnetic radiation from a second source of electromagnetic radiation, the third aiming subsystem optically aiming the electromagnetic radiation from the second source onto the surface on which the object is disposed; the fourth aiming subsystem optically operatively disposed such that the fourth aiming subsystem aims an optical field of a second image acquisition component to locations on the surface on which the object is disposed and on the object, and aiming the electromagnetic radiation from the second source to illuminate inspection reference patterns on the surface of the object substantially simultaneous with aiming of the optical field of the second image acquisition component, wherein the common coordinate system is the common coordinate system for the object, the first aiming subsystem, the second aiming subsystem, the third aiming subsystem and the fourth aiming subsystem.

A number of other embodiments are also disclosed.

For a better understanding of the present teachings, together with other and further needs thereof, reference is made to the accompanying drawings and detailed description.

DETAILED DESCRIPTION

Figure 1:
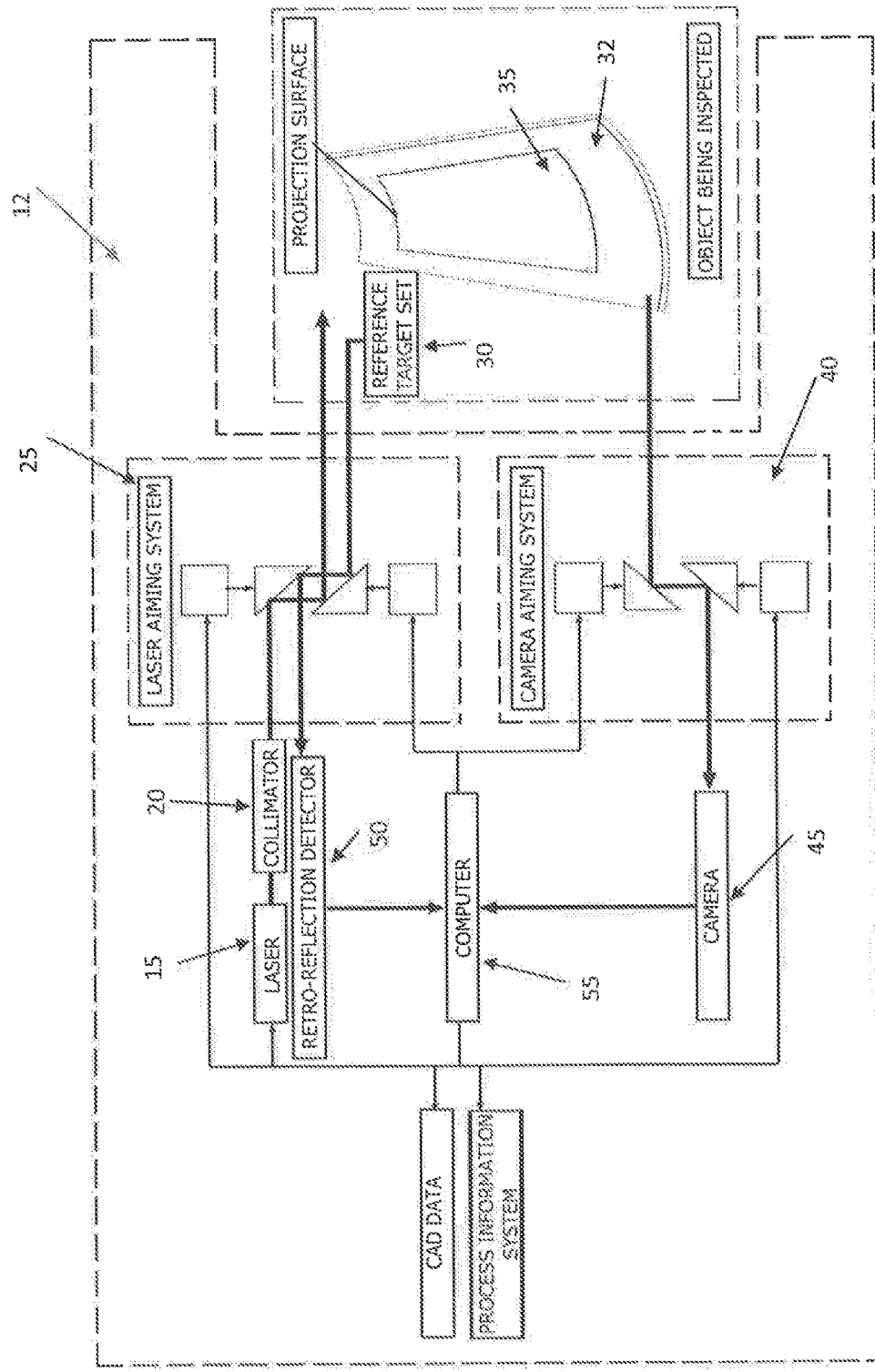
FIG. 1 is a block diagram representation of one embodiment of the system of these teachings.

In the description that follows, like components have been given the same reference numerals, regardless of whether they are shown in different examples. To illustrate example(s) in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

"Comprise," "include," and/or plural forms of each are open ended and include the listed parts and can include additional parts that are not listed. "And/or" is open ended and includes one or more of the listed parts and combinations of the listed parts.

Calibrated images" are the result of the object, Laser Aiming System (LAS) and Camera Aiming System (CAS) all being in a common coordinate system. The dimensions of each pixel in the high resolution/high magnification camera can now be defined at the nominal surface of the object. The accurate dimensioning of each pixel is enabled by the photogrammetric transform which precisely defines the dimensional and rotational relationship between the system and the object.

"Laser projection," as used herein, has the customary meaning of projection, causing an image to appear on a surface by use of the laser. As disclosed herein below, the LAS received electromagnetic radiation from a source and optics (a laser and an optical system, sometimes referred to as collimator) and provides (also referred to as illuminates or aims) the electromagnetic radiation onto a surface according to a predetermined pattern, thereby causing an image to appear on the surface. The causing the image to appear on the surface, as disclosed above, is referred to as herein as laser projection.

Methods and systems for efficient inspection that provide a record and detect foreign objects, and enable remote inspection are disclosed hereinbelow, Described hereinbelow are methods and systems for verifying and documenting correct fabrication for products that have critical characteristics that are realized during production. The system, combining laser projected inspection tolerance patterns, with automatic aiming of a camera's high-resolution-and-high-magnification field, eliminates the requirement for the inspector to move to the location of the feature to be inspected. Also, inspection of parts being processed at disparate locations can be carried out by a single, stationary, remote inspector. The Camera Aiming System (CAS) of the current disclosure, in one instance, aims the camera's field in milliseconds. The aiming of the camera is also as precise as the CAS, typically within a fraction of a mm in a 4 M field. The system automatically creates calibrated images that provide much more proof of correct fabrication than an acceptance code or a stamp in a book. In addition to the system's ability to detect FOD through analysis of images captured by the CAS (rigorously covering the precise surface defined by the design model), the system can guide an operator or inspector to the precise, suspect area, by projecting a pattern of laser light at the location requiring consideration.

Another advantage of the system is that a single system can capture images throughout a large area as a result of aiming the camera's field throughout the field of the CAS. A large array of cameras would be required to create a mosaic of a large region on parts or material being inspected. Also, if flaws are detected, they can be quickly and automatically pointed out with the laser so that a person can look at the indicated (with laser projection) area (either directly by being physically present, or remotely through images captured with the CAS) to decide what course of action should be taken in response to the problem detected in the images. This function saves time in rework or additional inspections by instantly guiding inspectors or rework operators to the precise, suspect location.

The camera and high magnification lens' field have well defined angles from the system to the object, and the distance from each pixel to a region on the object's surface is defined by the transform.

In one or more embodiments, the system of these teachings includes a source of electromagnetic radiation, a first aiming subsystem optically operatively disposed to receive the electromagnetic radiation from the source of electromagnetic radiation, the first aiming subsystem optically aiming the electromagnetic radiation onto a surface on which an object is disposed, an image acquisition component, a second aiming subsystem optically operatively disposed such that the second aiming subsystem aims an optical field of the image acquisition component to locations on the surface on which the object is disposed and on the object at which the electromagnetic radiation has been aimed, and a computing component receiving angular information defining a spatial relationship between the first aiming subsystem and predetermined features and angular information between the second aiming subsystem and the surface on which the object is disposed and the object; the predetermined features being located on the surface on which the object is disposed and on the object, the computing component being configured to establish the object, the first aiming subsystem and the second aiming subsystem in a common coordinate system, wherein the optical field of the image acquisition is aimed at regions illuminated by the electromagnetic radiation.

In one instance, the system of these teachings also includes a retro reflection sensor optically used to detect electromagnetic radiation reflected back from retroreflective features located on the surface on which the object is disposed and on the object. The retroreflective features are the predetermined features. The computing component is configured to receive a signal from the retro reflection sensor. The computing component is also configured to receive angular information obtained from a signal provided to the first aiming subsystem. The computing component is further configured to use the signal from the retro reflection sensor and the angular information in order to obtain the angles from the aiming subsystem to the retro reflective features.

In another instance, the angular information defining a spatial relationship between the first aiming subsystem and predetermined features and the angular information between the second aiming subsystem and the surface on which the object is disposed and the object is obtained from the image acquisition component and images of dimensionally defined features on the object or on the surface on which the object is disposed; the images acquired while the object is illuminated by the electromagnetic radiation.

In one embodiment, the source of electromagnetic radiation includes an emitting component and an optical system optically disposed to receive the electromagnetic radiation from the emitting component. In one instance, the emitting component is a laser. In one embodiment, the optical system is configured to focus the electromagnetic radiation onto a surface of the object to a smallest spot size. ("Smallest spot size," as used herein, refers to the diffraction limit, also known as resolution limit, operating focal spot.)

In another embodiment, the image acquisition component includes an electronic camera with a high magnification lens.

In one instance, the first aiming subsystem includes at least two rotatable reflecting components, each reflecting component being connected to a respective scanner, respective scanners being operatively connected to the computing component; the computing component being configured to provide control command to the respective scanners.

In one instance, the second aiming subsystem includes at least two rotatable reflecting components, each reflecting component being connected to a respective scanner, respective scanners being operatively connected to the computing component; the computing component being configured to provide control command to the respective scanners.

Figure 2:
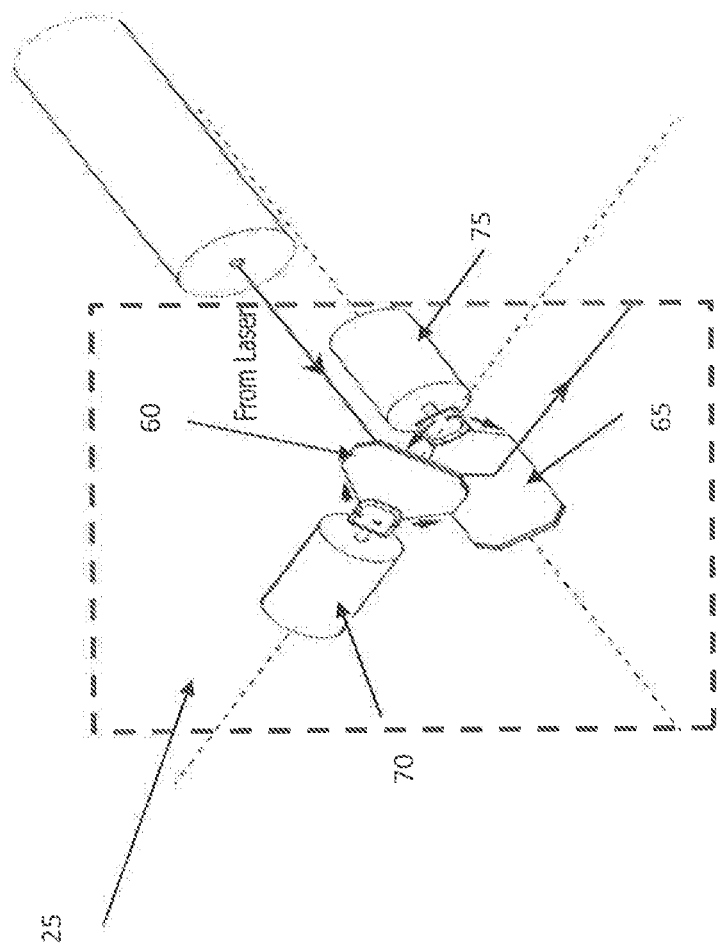
FIG. 2 is a graphical schematic representation of one embodiment of the first aiming subsystem of these teachings.
Figure 3:
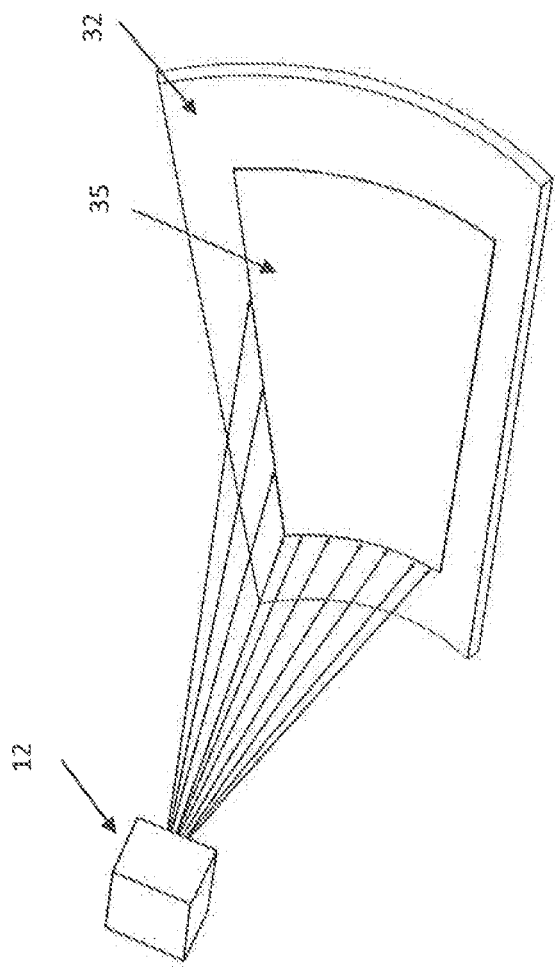
FIG. 3 shows, in one instance, operation of the first aiming subsystem of these teachings.
Figure 4:
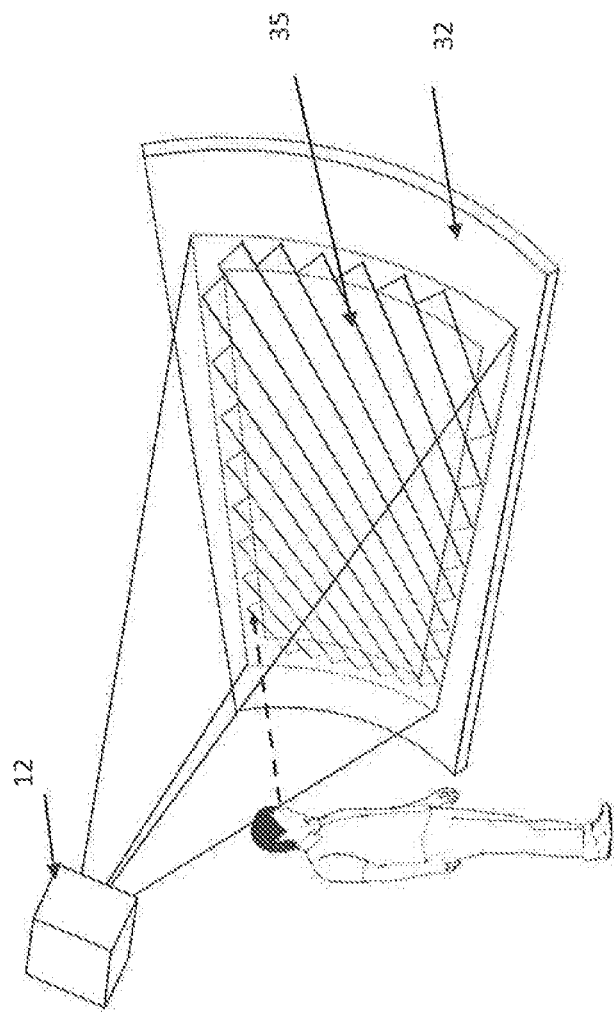
FIG. 4 shows, in another instance, operation of the first aiming subsystem of these teachings.
Figure 5:
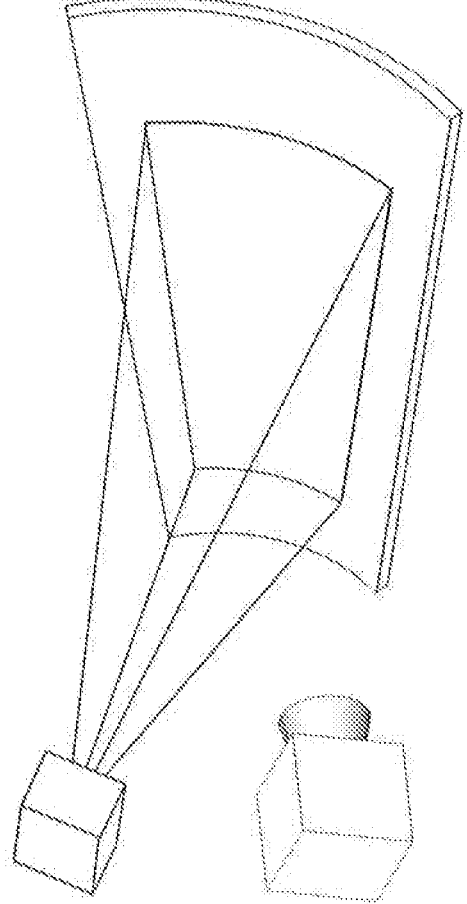
FIG. 5 shows, in yet another instance, operation of the first aiming subsystem of these teachings.
Figure 6:
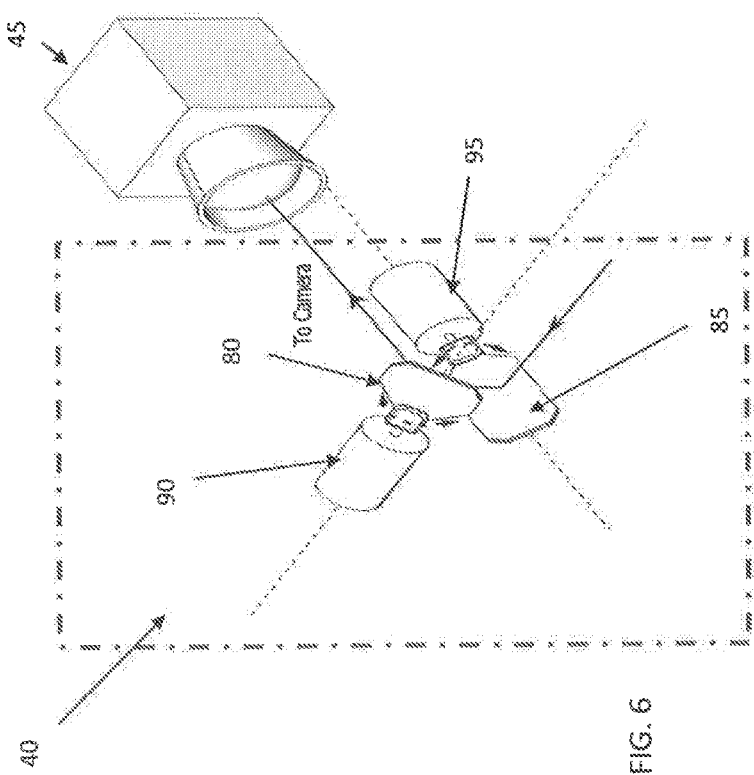
FIG. 6 is a graphical schematic representation of one embodiment of the second aiming subsystem of these teachings.
Figure 7:
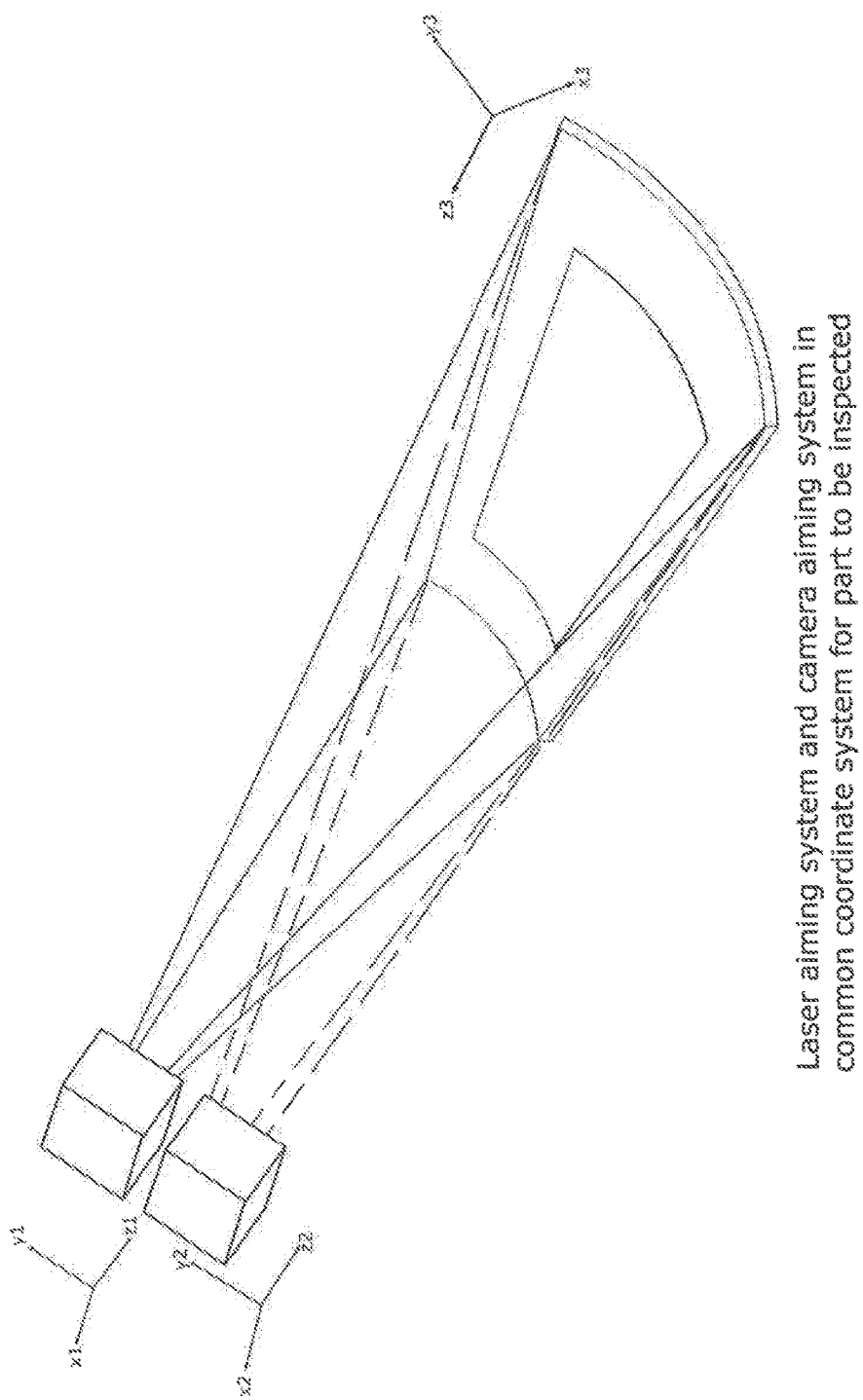
FIG. 7 shows, in one instance, operation of the second aiming subsystem of these teachings.
Figure 8:
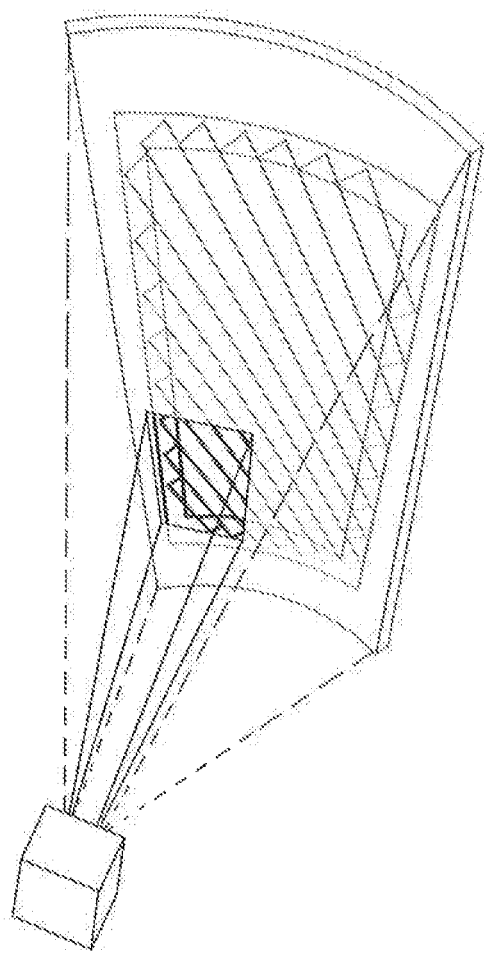
FIG. 8 shows, in another instance, operation of the second aiming subsystem of these teachings.

Turning now to the figures, an embodiment of the system 12 of the present disclosure (FIG. 1) combines two aiming subsystems 25, 40 (in one instance, configured as two sets of aiming optics), an electromagnetic radiation source (a laser in the embodiment shown) 15, an optical system 20 (also referred to as a collimator), a retro reflection sensor subsystem (referred to in FIG. 1 as retro-reflection detector) 50, a reference target set 30 and a high resolution camera with a high magnification lens 45. A computing component 55 (also referred to as a computer) is operatively connected to the retro reflection sensor subsystem 50, the two aiming subsystems 25, 40 and the image acquisition component 45. The computing component 55 receives angular information defining a spatial relationship between the first aiming subsystem and predetermined features and angular information between the second aiming subsystem and the surface on which the object is disposed and the object is configured to establish the object, the first aiming subsystem and the second aiming subsystem in a common coordinate system. One optical aiming system 25 (FIG. 2) aims a beam of laser light (Laser Aiming System/LAS 25 in FIG. 1) repeatedly through a series of angles rapidly enough that the path of the laser light on the surface of an object (FIG. 3) appears persistent to a human eye (FIG. 4) or camera exposure (FIG. 5). Referring to FIG. 2, in the embodiment shown therein, the optical scanning system includes two rotatable reflecting components 60, 65 (mirrors in the embodiment shown), each reflecting component 60, 65 being connected to a respective scanner 70, 75, respective scanners being operatively connected to the computing component 55, the computing component 55 being configured to provide control command to the respective scanners. The second optical aiming system 40 (FIG. 6) aims the field of the image acquisition component (also referred to as a high resolution camera) 45 with the high magnification lens (Camera Aiming System/CAS (in FIG. 1)) to locations 35 which are in the field of the laser projection. (The location 35 is located on a target (tool/mold in one instance) surface 32.) Referring to FIG. 6, in the embodiment shown there in, the second optical scanning system 40 includes two rotatable reflecting components 80, 85 (mirrors in the embodiment shown), each reflecting component 80, 85 being connected to a respective scanner 90, 95, respective scanners being operatively connected to the computing component 55, the computing component 55 being configured to provide control command to the respective scanners. The two optical aiming systems are configured in such a manner as to have a common coordinate system— that is, the camera's field as aimed by the CAS can be automatically synchronized to regions of interest where patterns of laser light are created by the LAS. This configuration (FIG. 7) enables the automatic capture of high resolution/high magnification images on regions of an object where reference patterns of laser light are projected (FIG. 8).

Figure 9:
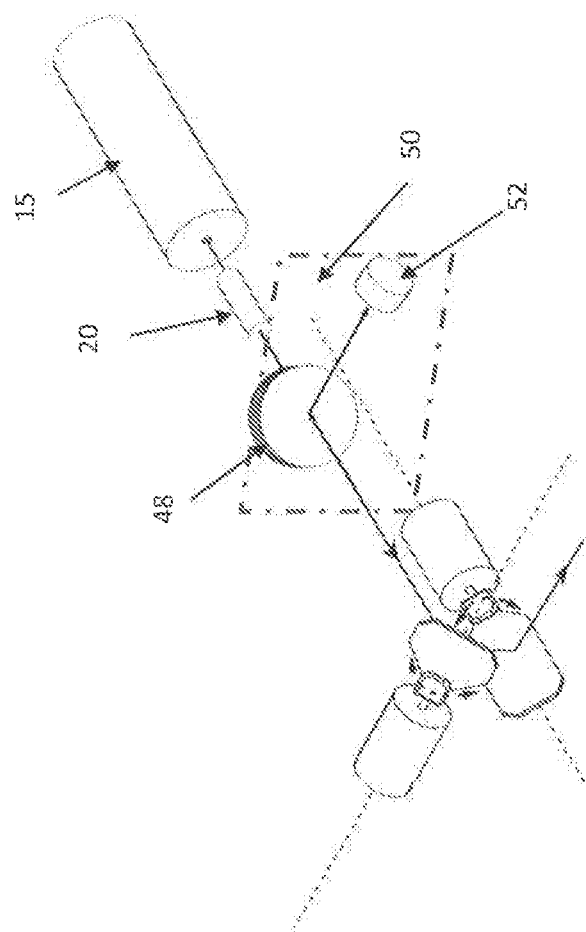
FIG. 9 is a graphical schematic representation of one embodiment of a retro reflection sensor as used in these teachings.
Figure 10:
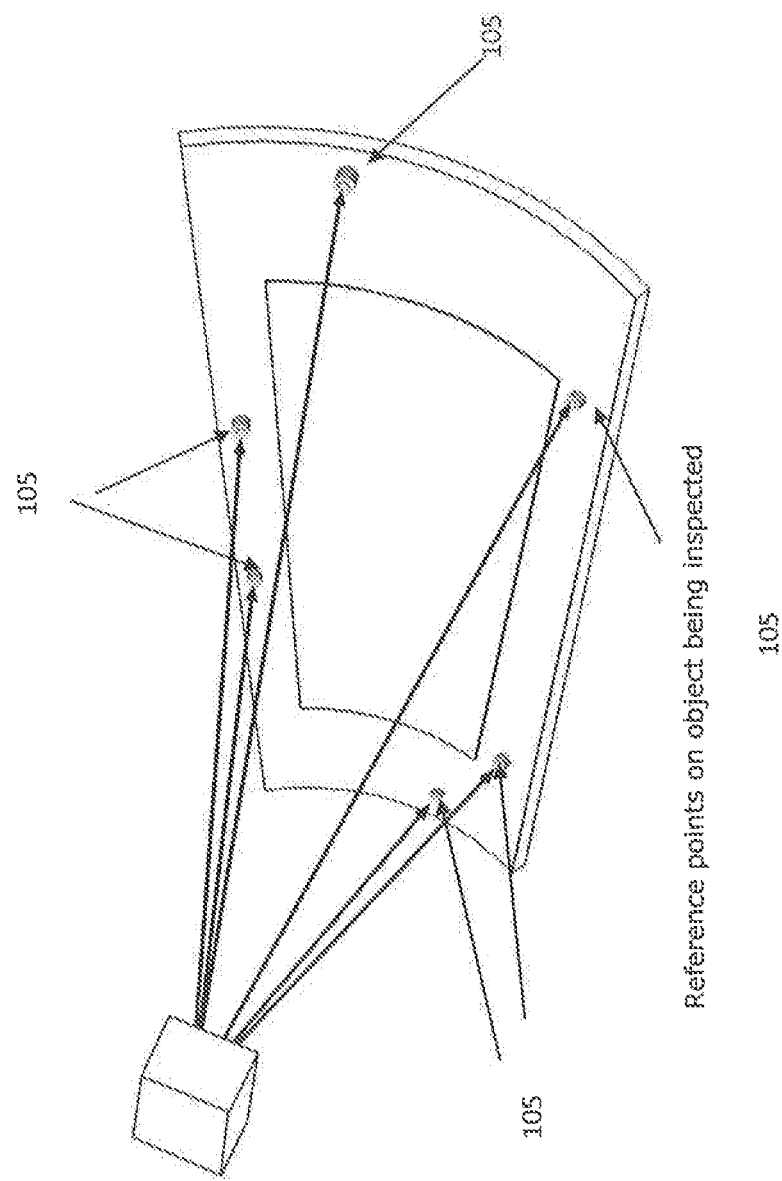
FIG. 10 shows use of retroreflective features in one embodiment of these teachings.

The LAS incorporates in one embodiment, a retroflection sensor subsystem 50 (FIG. 9) that enables the detection of laser light that is reflected back to the system when the laser is aimed at high contrast, retroreflective materials. Referring to FIG. 9, in the embodiment shown therein, the retro reflection sensor subsystem 50 includes a light selective optical component 48 and a retro reflection detector 52. When these retroreflective features 105 (references) are at known (dimensionally defined) locations relative to the object (FIG. 10) being inspected, they enable a process that defines the spatial relationship between the coordinate system of the object and the LAS. The result of processing measured angles to known dimensional locations is called a photogrammetric transform. The photogrammetric transform defines the translations and rotations along and about the three axes (X, Y and Z) of the object's coordinate system that would make the object be in the same coordinate system as the system (or vice versa: from the system's coordinate system into the object's coordinate system) (see, for example, Konrad Schindler, Mathematical Foundations of Photogrammetry, and Jeffrey J. Shan, A Photogrammetric Solution for Projective Reconstruction, SPIE *Vision Geometry VIII*, 19-20 Jul. 1999, Jain. Kasturi, Schunck, Machine Vision, Chapter 12, Calibration, all of which are incorporated by reference herein in their entirety and for all purposes).

When the angles from the LAS to the object references (FIG. 10) are known, and the definition of the references in the coordinate system of the object are known, the object, LAS and CAS will all be established in a common coordinate system.

Figure 11:
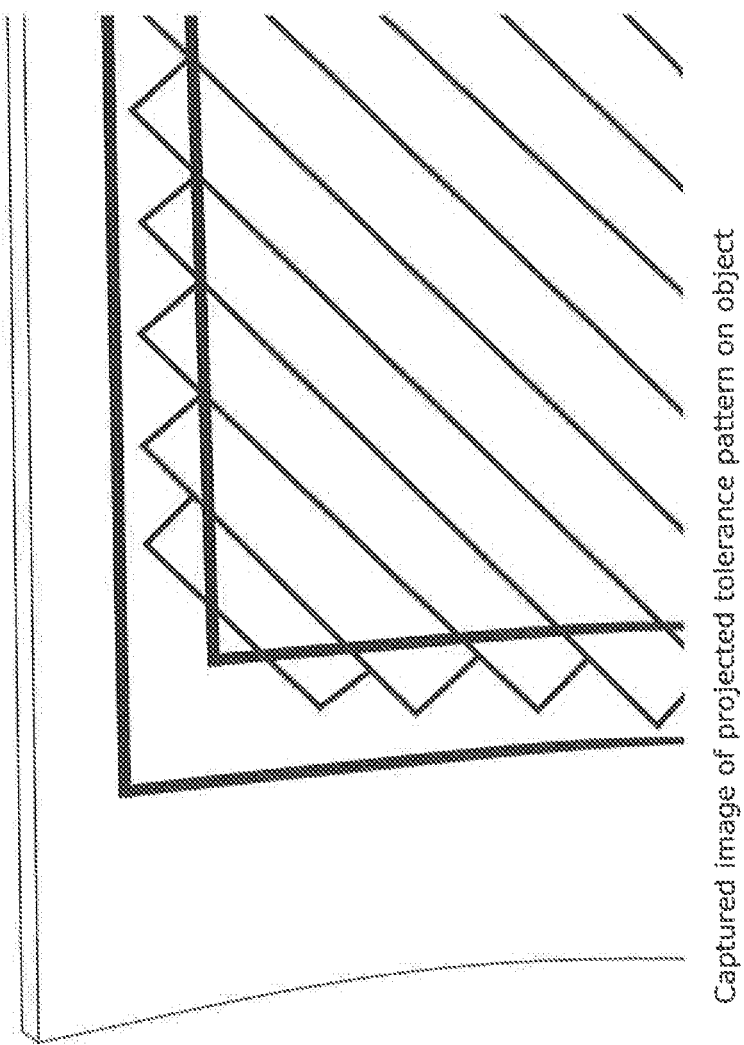
FIG. 11 shows an exemplary embodiment of an inspection image as obtained from an embodiment of the system of these teachings.

Having the object being inspected in a common coordinate system with the LAS and CAS enables the automatic aiming of laser light to make inspection tolerance patterns (FIG. 11) visible on the surface of the object simultaneous with the automatic aiming of the high resolution/high magnification CAS (FIG. 8) so that calibrated images of features on the object can be captured with laser projected inspection reference patterns.

In one or more embodiments, the method of these teachings includes obtaining angular information defining a spatial relationship between a first aiming subsystem and predetermined features and angular information between a second aiming subsystem and a surface on which an object is disposed and the object; the predetermined features being located on the surface on which the object is disposed and on the object, the first aiming subsystem optically operatively disposed to receive electromagnetic radiation from a first source of electromagnetic radiation; the first aiming subsystem optically aiming the electromagnetic radiation from the first source onto the surface on which the object is disposed, the second aiming subsystem optically operatively disposed such that the second aiming subsystem aims an optical field of a first image acquisition component to locations on the surface on which the object is disposed and on the object, determining a common coordinate system for the object, the first aiming subsystem and the second aiming subsystem, and aiming the electromagnetic radiation from the first source to illuminate inspection reference patterns on the surface of the object substantially simultaneous with aiming of the optical field of the first image acquisition component; and capturing calibrated images of features on the object; the calibrated images generated by illumination of inspection reference patterns.

In one instance, the method also includes providing the calibrated images to another location. In another instance, the predetermined features are retroreflective features and electromagnetic radiation reflected back from retroreflective features located on the surface on which the object is disposed and on the object provide the angular information defining the spatial relationship between the first aiming subsystem and the predetermined features. In one embodiment, the electromagnetic radiation from the first source is focused on to a surface of the object with a smallest spot size. In another embodiment, the electromagnetic radiation from the first source is provided to the object in that defocused pattern.

In yet another embodiment, the method of these teachings also includes obtaining angular information defining a spatial relationship between a third aiming subsystem and predetermined features and angular information between a fourth aiming subsystem and a surface on which an object is disposed and the object, the predetermined features being located on the surface on which the object is disposed and on the object, the third aiming subsystem optically operatively disposed to receive electromagnetic radiation from a second source of electromagnetic radiation, the third aiming subsystem optically aiming the electromagnetic radiation from the second source onto the surface on which the object is disposed; the fourth aiming subsystem optically operatively disposed such that the fourth aiming subsystem aims an optical field of a second image acquisition component to locations on the surface on which the object is disposed and on the object, and aiming the electromagnetic radiation from the second source to illuminate inspection reference patterns on the surface of the object substantially simultaneous with aiming of the optical field of the second image acquisition component, wherein the common coordinate system is the common coordinate system for the object, the first aiming subsystem, the second aiming subsystem, the third aiming subsystem and the fourth aiming subsystem. In one instance, the third aiming subsystem illuminates the electromagnetic radiation from the second source along substantially tangent lines on the object; and wherein the fourth aiming subsystem is configured to provide an image to the second image acquisition component as viewed from substantially directly from above.

In order to further elucidate these teachings, exemplary embodiments are presented hereinbelow. It should be noted that these teachings are not limited only to the exemplary embodiments.

EXEMPLARY EMBODIMENTS

The automatic capture of high resolution/high magnification images with projected laser tolerance patterns (FIG. 8) has advantages in both manual and automated inspection.

In manual inspection (a person is looking at a feature and a projected tolerance pattern, and determining whether or not it is acceptable (FIG. 4)), when using the system, the inspector no longer needs to be physically present at the feature being inspected. Remote inspection saves process time by delivering the inspection images (FIG. 11), with projected tolerance patterns and features being inspected, to the most convenient place for the inspection. Additionally, the images can be automatically enhanced to enable more robust inspection through enhanced contrast, color, magnification, etc. to improve the visibility of the features and inspection tolerances.

In automated inspection, the system automatically coordinates the presence of the projected laser tolerance patterns and the image capture (FIG. 8). The parameters of the image capture can be defined to enhance detectability of the features being verified, as well as the laser tolerance pattern used in the inspection process. The detectability of the features, in one embodiment, include using optical characteristics such as polarization.

In automated inspection (no human looking at the captured images) the system provides high resolution, high magnification images, both with and without laser patterns in the images (the lack of laser patterns referred to as blank patterns), for processing by image analysis algorithms to automatically determine whether or not the critical characteristics are in or out of tolerance.

The establishment of the common coordinate system between the system and the object being inspected can also be accomplished with the CAS.

When the LAS is projecting patterns defining tolerance limits and locations for manual processing, the collimator is focusing the laser light so as to have a minimum spot size. This results in maximum brightness (energy density) and sharpness of the projected pattern. Sharp pattern lines are required when tolerances to be observed by the CAS or human inspectors are verifying tight tolerances. The collimator may also be used to create different spot sizes where reflected or unreflected laser light is to be observed by the CAS.

Defocused laser light can also be used to illuminate features being observed by the CAS. For example, a defocused laser pattern covering the surface around a hole will make it easy to "see" (visually or with machine vision) the presence and characteristics (such as burrs or scratches) of the hole in the high magnification image automatically captured by the CAS.

As an alternative to retro reflectively mapping targets with the laser and LAS, a set of angles between the CAS and dimensionally defined features on, or related to, the object being inspected can be used to define the spatial relationship between the system (the CAS and the LAS) and the object. The laser patterns will be accurately displayed on the object's surface because the CAS and the LAS are in a common coordinate system in the system (FIG. 1).

The CAS can be used without projected laser references. Once the system is in the same coordinate system as the object being inspected, the ability to dimension each pixel in the high resolution/high magnification image relative to the nominal surface of the object is enabled. A "region of interest" representing a tolerance band of pixels can be calculated and used with automated image analysis. (See, U.S. Pat. No. 6,304,680, incorporated herein by reference in its entirety and for all purposes.)

Figure 12:
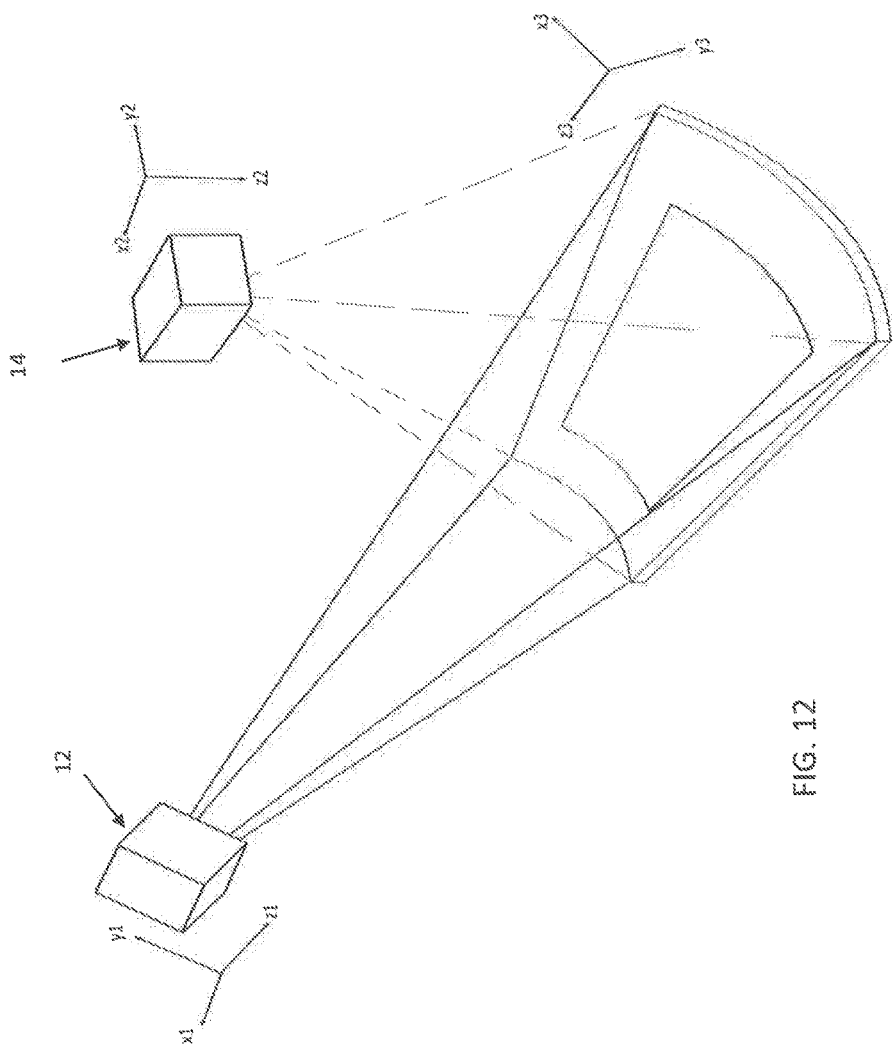
FIG. 12 shows use of another embodiment of the system of these teachings.
Figure 13:
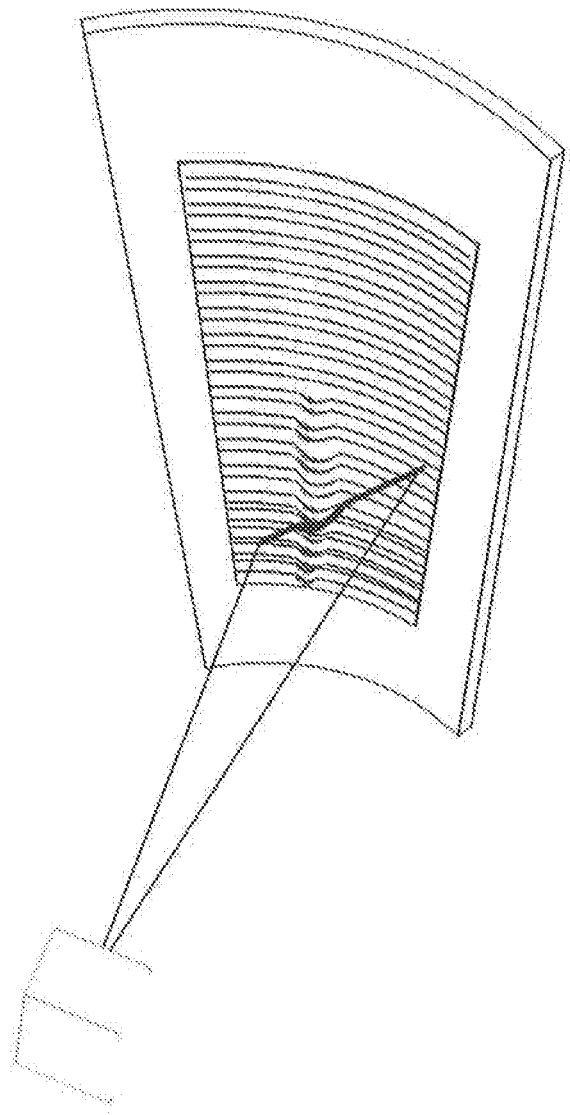
FIG. 13 shows operation of another embodiment of the system of these teachings.
Figure 15:
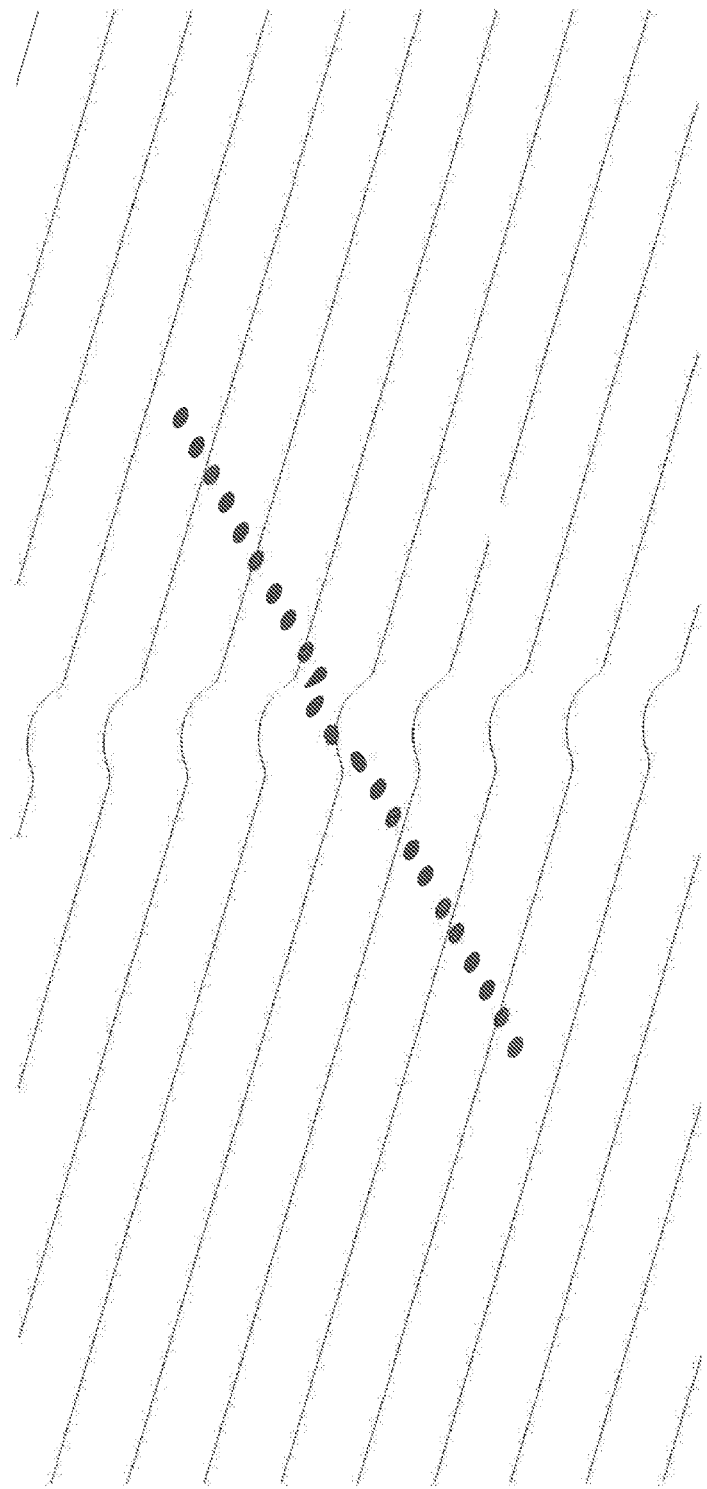
FIG. 15 shows an exemplary embodiment of an image obtained during operation of another embodiment of the system of these teachings.

Employing multiple systems (FIG. 12) enables automatic inspection for features that are difficult to verify. For example, a production process involving cloth laminates (composites) may require no wrinkles beyond a specified dimension. Configuring two systems 12, 14 on a common object (FIG. 12), with one LAS projecting somewhat tangent lines on an object, while the second system's CAS is viewing the object's surface from directly above will cause a parallax effect in images captured by the CAS system if wrinkles are present (FIG. 15). With both systems and the object in a common coordinate system, the pixels in the camera observing the parallax distortions in the somewhat tangent plane of light on the surface (FIG. 12) will represent the dimensions of the wrinkles on the surface of the object, using the laser and collimator as illumination source for images captured by the CAS (FIG. 13).

Figure 14:
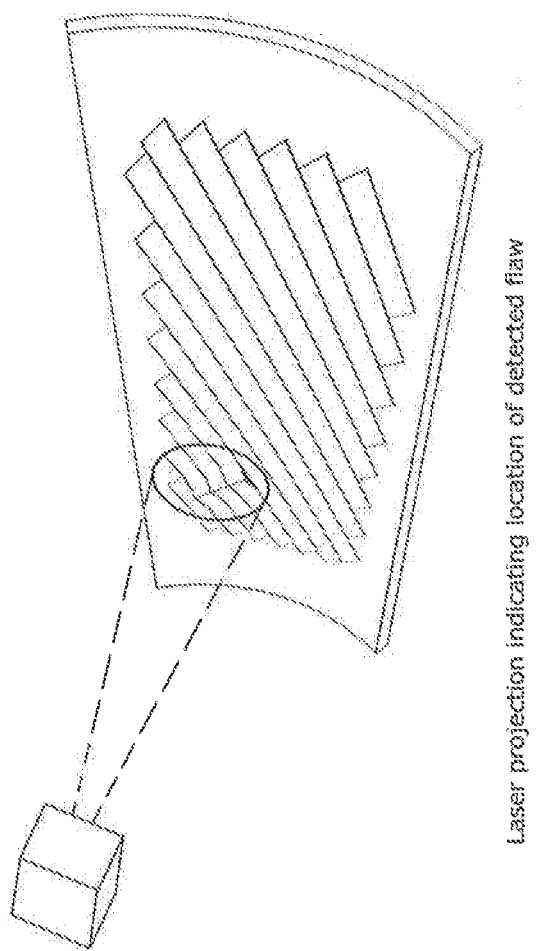
FIG. 14 shows another exemplary instance of operation of another embodiment of the system of these teachings.

In addition to the system's ability to detect this FOD through analysis of images captured by the CAS (rigorously covering the precise surface defined by the design model), the system can guide an operator or inspector the precise, suspect area, by projecting a pattern of laser light at the location requiring consideration (FIG. 14). As stated above, the dimensions of each pixel in the high resolution/high magnification camera can now be defined at the nominal surface of the object. The accurate dimensioning of each pixel is enabled by the photogrammetric transform which precisely defines the dimensional and rotational relationship between the system and the object. As in the examples above, the calibrated images are selected such that detectability of predetermined features (such as, for example, particular defects) is enhanced. Dimensions of the predetermined features in a calibrated image are referenced to a location in the surface of the object. The predetermined features in the calibrated image can be referenced to an actual location on the object. In one instance, the electromagnetic radiation from the first source is aimed to illuminate the object at the location on the object corresponding to the location at which the dimensions of the predetermined features in the calibrated image are referenced. In one embodiment, the calibrated image is analyzed to detect the predetermined feature and, since the dimensions of the predetermined features in the calibrated image are referenced to a location in the surface of the object, the location of the predetermined features on the object is known (for image analysis, see, for example, Machine Vision Inspection Software, Quality Magazine, incorporated herein by reference in its entirety and for all purposes). Under control of the computing component, the electromagnetic radiation from the first source is aimed to illuminate the object at the location on the object corresponding to the location at which the dimensions of the predetermined features in the calibrated image are referenced (for computer control of scanner, see, for example, Charles A. Harlow et al., Automated Inspection of Electronic Assemblies, April 1975, or Review of Progress in Quantitative Nondestructive Evaluation: Volume 14A/14B, edited by Donald O. Thompson, Dale E. Chimenti, pp. 301-302, both of which are incorporated herein by reference in their entirety and for all purposes).

Figure 16:
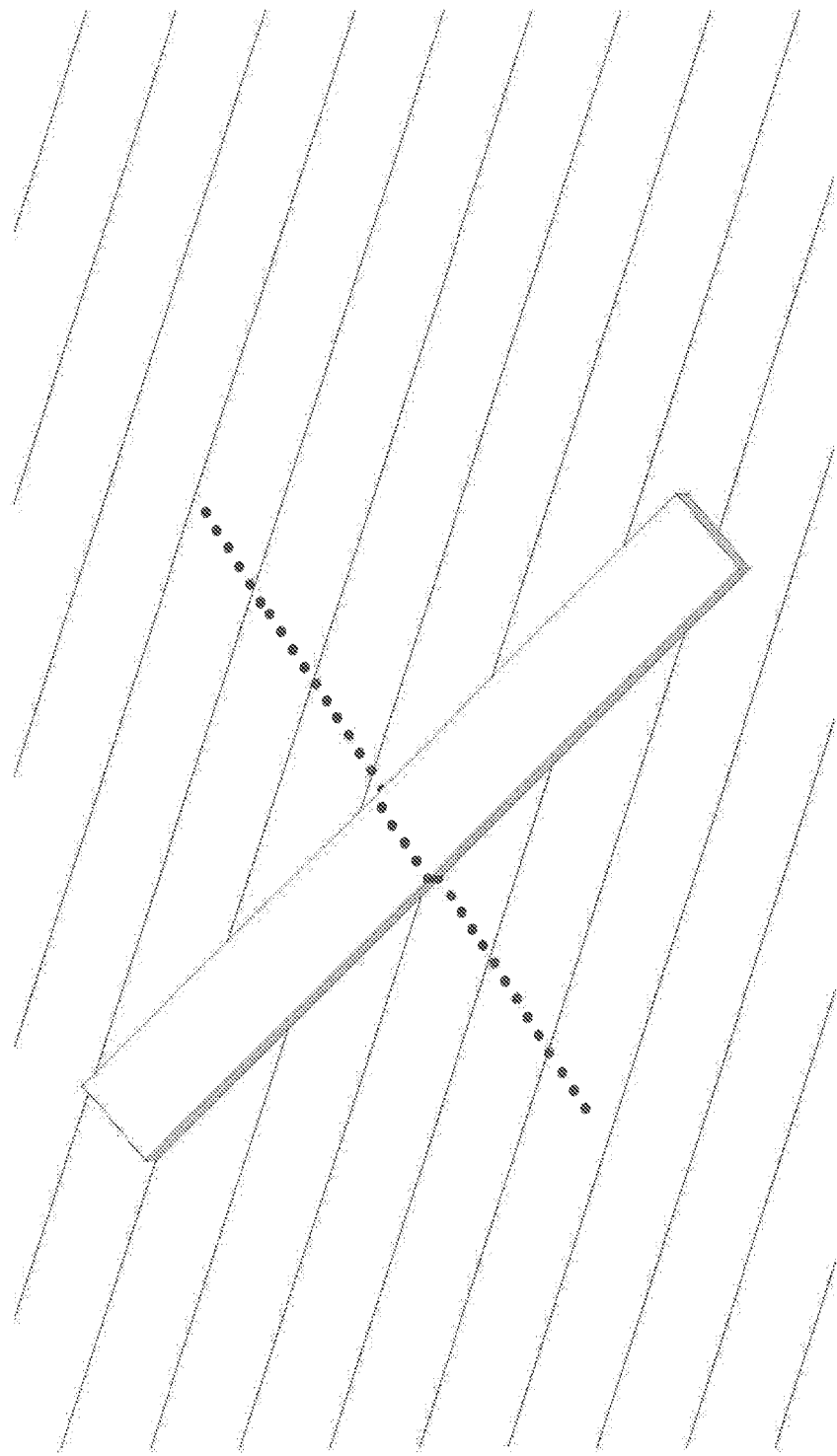
FIG. 16 shows another exemplary embodiment of an image obtained during operation of another embodiment of the system of these teachings.

The ability to identify wrinkles on an object also enables the identification of loose pieces of native material on the surface that would be difficult to identify with a camera because of the common color. A loose piece of material, even if it is very thin, will cause a bump in a plane of somewhat tangently projected laser light (LAS), because of parallax, when viewed from above (CAS), as the somewhat tangent line of light crosses the edge of the loose material on the object (FIG. 16).

Figure 17:
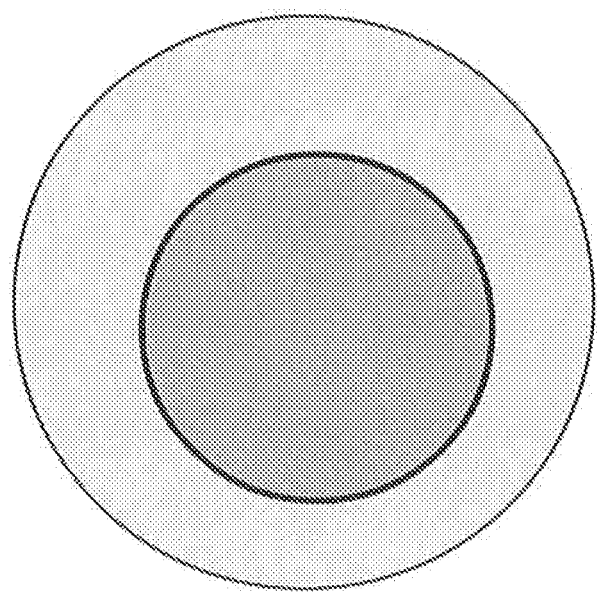
FIG. 17 shows yet another exemplary embodiment of an image obtained during operation of an embodiment of the system of these teachings.

The common coordinate system for the object, the LAS and the CAS is more precisely defined if the CAS precisely determines the angles from the CAS to the retroreflective references defining the coordinate system of the object. Using the optical system 20 in the LAS to create a laser spot size larger than the retroreflective material on the object's references (FIG. 17) enables the camera to capture a very high contrast image of the retroreflective reference. A dot of laser light, even defocused so as to not minimize spot size, is significantly brighter than most manufacturing ambient lighting. Also, the coherence of the laser color provides sharp contrast to any other reflected light in the manufacturing ambient. The combination of much-brighter-than-ambient over the small region where the retroreflective reference is located, combined with the coherence of the laser color, maximizes the retroreflective signal relative to everything else around it. The retroreflective reference location is well defined relative to the system as a result of the creation of a photogrammetric transform by the LAS. This definition of the retroreflective reference location enables the defocused laser light to illuminate the reference in such a way as to provide the maximum retroreflective signal to noise ratio above the ambient lighting. Illuminating the region of the retroreflective reference with defocused laser light does not increase the illumination anywhere else. This prevents illumination distractions that can be caused by flashes or flood lighting.

Figure 18:
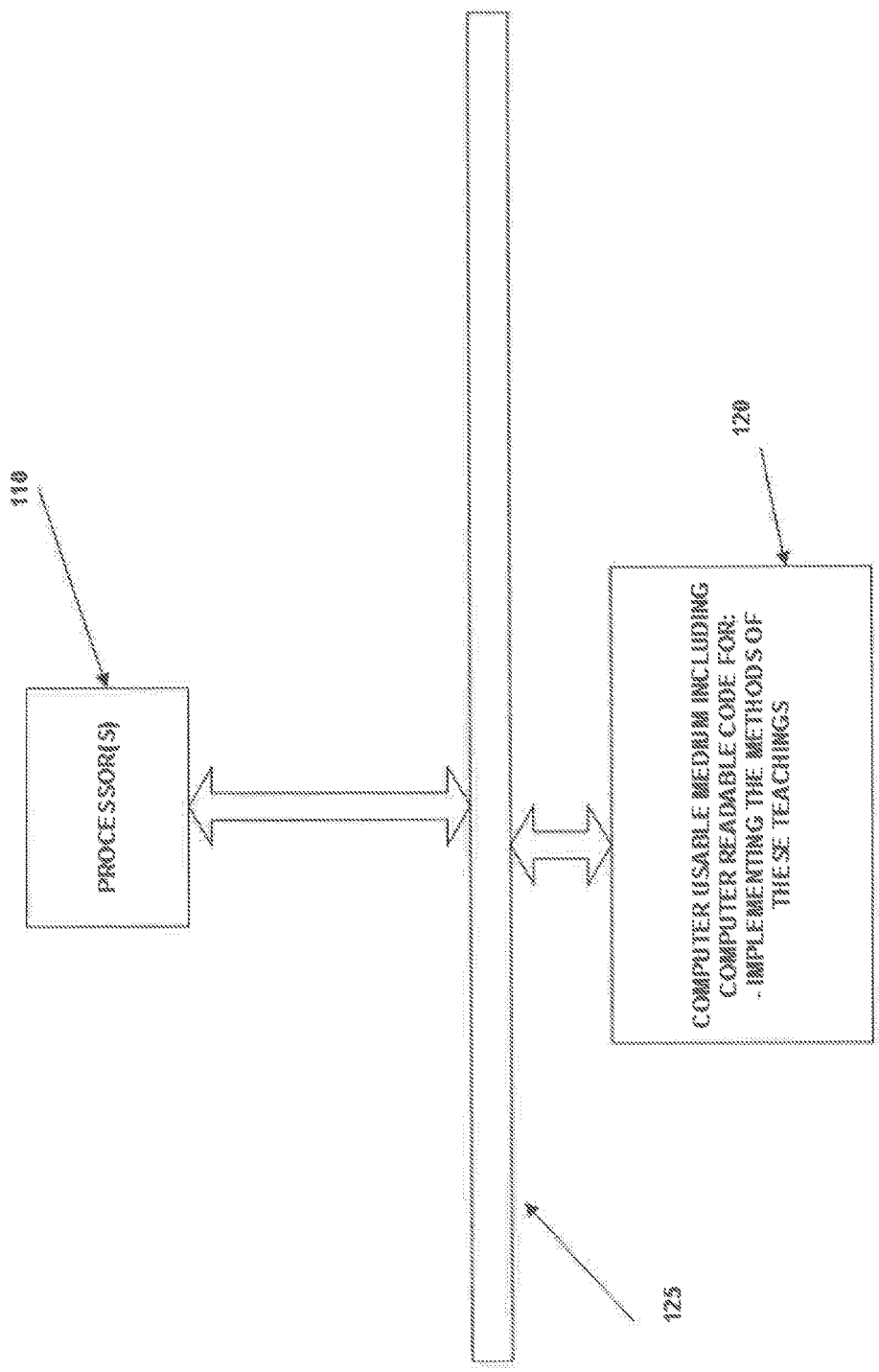
FIG. 18 shows an embodiment of the computing component in the system of these teachings.

In one embodiment, the computing component in the system of these teachings includes one or more processors and one or more computer usable media having computer readable code embodied therein, the computer readable code causing the one or more processors to execute the method of these teachings, shown in FIG. 18. In that embodiment, the computing component is configured to perform certain tasks by executing the computer readable code embodied in the computer usable media. Referring to FIG. 18, in the embodiment shown therein, one or more processors 110 are operatively connected to computer usable media 120 that has computer readable code embodied therein, which, when executed by the one or more processors 110, causes the one or more processors to perform the method of these teachings. The one or more processors 110, the computer readable media 120 and input devices are operatively connected by means of a computer connection component 125 (such as a computer bus).

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metallization(s) interconnects of the base gate array ASIC architecture or selecting and providing metallization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CI)), or 'other type of memory system which maintains data even after power is removed from the system.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session. The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet. e.g., an I-phone™, Blackberry™, Droid™ or the like, a manufacturing tool, or any other device including a computing device, comprising one or more data processors, etc.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although these teachings have been described with respect to various embodiments, it should be realized these teachings are also capable of a wide variety of further and other embodiments within the spirit and scope of the appended claims.

What is claimed is:

1. A system for inspecting objects, the system comprising:
   a source of electromagnetic radiation;
   a first aiming subsystem optically operatively disposed to receive the electromagnetic radiation from the source of electromagnetic radiation; the first aiming subsystem optically aiming the electromagnetic radiation onto a surface on which an object is disposed;
   an image acquisition component; wherein the image acquisition component comprises an electronic camera with a lens;
   a second aiming subsystem optically operatively disposed such that the second aiming subsystem aims an optical field of the image acquisition component to locations on the surface on which the object is disposed and on the object at which the electromagnetic radiation has been aimed; and
   a computing component receiving angular information defining a spatial relationship between the first aiming subsystem and predetermined features and angular information between the second aiming subsystem and the surface on which the object is disposed and the object; the predetermined features being located on the surface on which the object is disposed and on the object; the computing component being configured to establish the object, the first aiming subsystem and the second aiming subsystem in a common coordinate system by use of photogrammetric transforms;
   wherein the optical field of the image acquisition component is aimed at regions illuminated by the electromagnetic radiation;
   wherein the common coordinate system results in dimensioning each pixel in an image captured by the image acquisition component.

2. The system of claim 1 further comprising a retro reflection sensor optically used to detect electromagnetic radiation reflected back from retroreflective features located on the surface on which the object is disposed and on the object; wherein the retroreflective features are the predetermined features; the computing component being configured to receive the angular information obtained using a signal from the retro reflection sensor.

3. The system of claim 1 wherein the angular information defining a spatial relationship between the first aiming subsystem and predetermined features and the angular information between the second aiming subsystem and the surface on which the object is disposed and the object is obtained from the image acquisition component and images of dimensionally defined features on the object or on the surface on which the object is disposed; the images acquired while the object is illuminated by the electromagnetic radiation.

4. The system of claim 1 wherein the source of electromagnetic radiation comprises an emitting component and an optical system optically disposed to receive the electromagnetic radiation from the emitting component.

5. The system of claim 4 wherein the emitting component is one laser.

6. The system of claim 4 wherein the optical system is configured to focus the electromagnetic radiation onto a surface of the object to a smallest spot size.

7. The system of claim 1 wherein the image acquisition component comprises one electronic camera with a high magnification lens.

8. The system of claim 1 wherein the first aiming subsystem comprises at least two rotatable reflecting components, each reflecting component being connected to a respective scanner, respective scanners being operatively connected to the computing components; the computing component being configured to provide control command to the respective scanners.

9. The system of claim 1 wherein the second aiming subsystem comprises at least two rotatable reflecting components, each reflecting component being connected to a respective scanner, respective scanners being operatively connected to the computing component; the computing component being configured to provide control command to the respective scanners.

10. The system of claim 1 wherein dimensions of said each pixel are defined in reference to a surface of the object.

11. A method for inspecting objects, the method comprising:
   obtaining angular information defining a spatial relationship between a first aiming subsystem and predetermined features and angular information between a second aiming subsystem and a surface on which an object is disposed and the object; the predetermined features being located on the surface on which the object is disposed and on the object; the first aiming subsystem optically operatively disposed to receive electromagnetic radiation from a first source of electromagnetic radiation; the first aiming subsystem optically aiming the electromagnetic radiation from the first source onto the surface on which the object is disposed; the second aiming subsystem optically operatively disposed such that the second aiming subsystem aims an optical field of a first image acquisition component to locations on the surface on which the object is disposed and on the object; wherein the first image acquisition component comprises an electronic camera with a lens;

determining a common coordinate system for the object, the first aiming subsystem and the second aiming subsystem using photogrammetric transforms;

aiming the electromagnetic radiation from the first source to illuminate inspection reference patterns on the surface of the object substantially simultaneous with aiming of the optical field of the first image acquisition component; and capturing calibrated images of features on the object; the calibrated images generated by illumination of inspection reference patterns;

wherein the common coordinate system results in dimensioning each pixel in the calibrated image captured by the first image acquisition component;

wherein the determining the common coordinate system and control of aiming and capturing is performed by a computing component configured to perform these tasks.

12. The method of claim 11 further comprising providing the calibrated images to another location.

13. The method of claim 11 wherein the predetermined features are retroreflective features; and wherein electromagnetic radiation reflected back from retroreflective features located on the surface on which the object is disposed and on the object provide the angular information defining the spatial relationship between the first aiming subsystem and the predetermined features.

14. The method of claim 11 wherein the electromagnetic radiation from the first source is focused on to a surface of the object with a smallest spot size.

15. The method of claim 11 wherein the electromagnetic radiation from the first source is provided to the object in a defocused pattern.

16. A method for inspecting objects, the method comprising:

obtaining angular information defining a spatial relationship between a first aiming subsystem and predetermined features and angular information between a second aiming subsystem and a surface on which an object is disposed and the object; the predetermined features being located on the surface on which the object is disposed and on the object; the first aiming subsystem optically operatively disposed to receive electromagnetic radiation from a first source of electromagnetic radiation; the first aiming subsystem optically aiming the electromagnetic radiation from the first source onto the surface on which the object is disposed; the second aiming subsystem optically operatively disposed such that the second aiming subsystem aims an optical field of a first image acquisition unit to locations on the surface of which the object is disposed and on the object; wherein the first image acquisition component comprises an electronic camera with a lens;

determining a common coordinating system for the object, the first aiming subsystem and the second aiming subsystem using photogrammetric transform;

aiming the electromagnetic radiation from the first source to illuminate inspection reference patterns on the surface of the object substantially simultaneous with aiming of the optical field of the first image acquisition unit;

capturing calibrated images of features on the object; the calibrated images generated by illumination of inspection reference patterns;

obtaining angular information defining a spatial relationship between a third aiming subsystem and predetermined features and angular information between a fourth aiming subsystem and a surface on which an object is disposed and the object; the predetermined features being located on the surface on which the object is disposed and on the object; the third aiming subsystem optically operatively disposed to receive electromagnetic radiation from a second source of electromagnetic radiation; the third aiming subsystem optically aiming the electromagnetic radiation from the second source onto the surface on which the object is disposed; the fourth aiming subsystem optically operatively disposed such that the fourth aiming subsystem aims an optical field of a second image acquisition component to locations on the surface on which the object is disposed and on the object; wherein the second image acquisition component comprises an electronic camera with a lens;

and aiming the electromagnetic radiation from the second source to illuminate inspection reference patterns on the surface of the object substantially simultaneous with aiming of the optical field of the second image acquisition component;

wherein the common coordinate system results in dimensioning each pixel in the calibrated image captured by the image acquisition unit;

wherein the determining the common coordinate system and control of aiming and capturing is performed by a computing unit configured to perform these tasks; and wherein the common coordinate system is the common coordinate system for the object, the first aiming subsystem, the second aiming subsystem, the third aiming subsystem and the fourth aiming subsystem.

17. The method of claim 16 wherein the third aiming subsystem illuminates the electromagnetic radiation from the second source along substantially tangent lines on the object; and wherein the fourth aiming subsystem is configured to provide an image to the second image acquisition component as viewed from substantially directly from above.

18. The method of claim 11 wherein the calibrated images are selected such that detectability of predetermined features is enhanced.

19. The method of claim 18 wherein the detectability comprises using optical characteristics.

20. The method of claim 18 wherein the optical characteristics comprise polarization.

21. The method of claim 11 wherein the calibrated image is an image of an area of the object.

22. The method of claim 21 wherein a tolerance band of pixels is obtained.

23. The method of claim 11 wherein the inspection reference patterns are blank patterns.

24. The method of claim 11 wherein dimensions of said each pixel are defined in reference to a surface of the object.

25. The method of claim 24 wherein the calibrated images are selected such that detectability of predetermined features is enhanced; and wherein dimensions of the predetermined features in a calibrated image are referenced to a location on the surface of the object.

26. The method of claim 25 further comprising:

aiming the electromagnetic radiation from the first source to illuminate the object at the location on the surface of the object to which the dimensions of the predetermined features in the calibrated image are referenced.

* * * * *